May 20, 1969     V. A. RATNER     3,445,633
AUTOMATIC TICKETING SYSTEM
Filed March 5, 1965     Sheet _1_ of 4
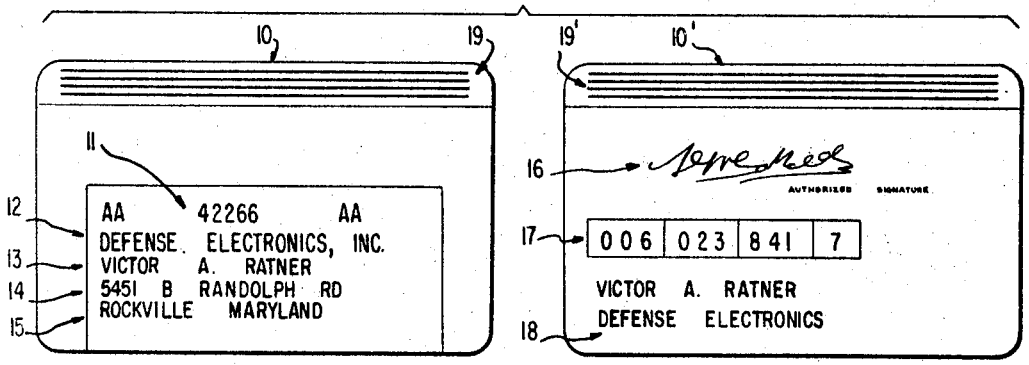
FIG.1
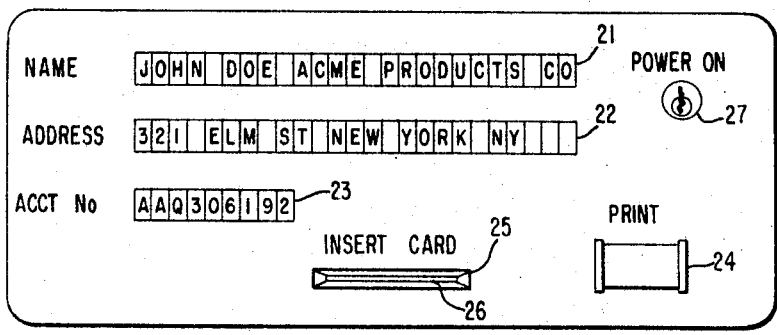
FIG.2
FIG.3a
INVENTOR
VICTOR A. RATNER
BY     ATTORNEYS

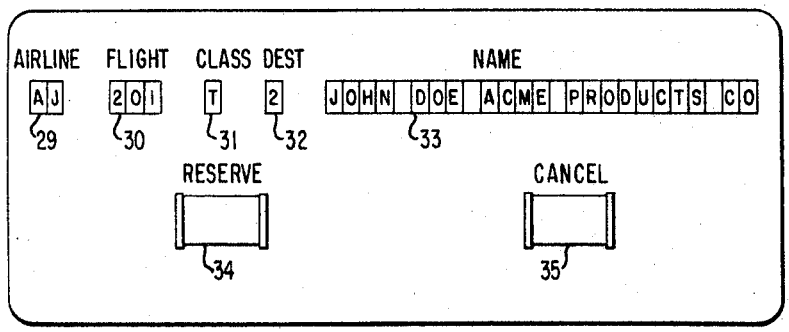
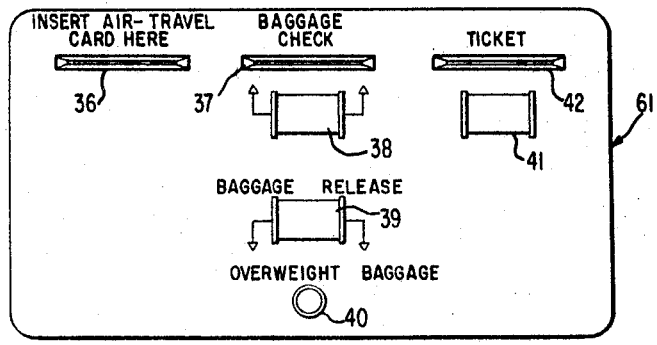
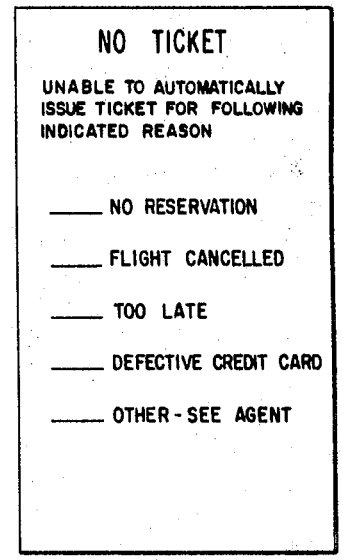

May 20, 1969  V. A. RATNER  3,445,633
AUTOMATIC TICKETING SYSTEM
Filed March 5, 1965  Sheet 3 of 4

INVENTOR
VICTOR A. RATNER

BY Browne, Schuyler & Beveridge
ATTORNEYS

United States Patent Office 3,445,633
Patented May 20, 1969

3,445,633
AUTOMATIC TICKETING SYSTEM
Victor A. Ratner, Gaithersburg, Md., assignor to Defense Electronics, Inc., Rockville, Md., a corporation of Delaware
Filed Mar. 5, 1965, Ser. No. 437,410
Int. Cl. G07f 7/02
U.S. Cl. 235—61.7                 13 Claims This invention relates generally to an automated system for recording information and issuing transportation tickets, and more particularly to flight check-in systems for use with credit cards on a self-service basis without the intervention of a ticket seller.

A number of systems are known for automatic print-out of stored information and for recognition and recording of identification information such as might be contained on a personalized card inserted into a recording or a readout machine. Other systems are known in which punched or coded cards bear desired information to be utilized or to add to recorded information for various storage and readout purposes.

A significant need is recognized for an automated system which combines parts of these prior mechanisms into a system operative to eliminate the need for a ticket seller to avoid a long wait in line often experienced by a person boarding a plane or train where a large number of people must be passed through a single sales and confirmation check point immediately prior to departure. It is common experience that even confirmed reservations still require expensive and troublesome waiting in line, both to obtain the issuance of the ticket, and to weight and check-in any baggage incident to the trip.

It is accordingly an object of this invention to provide an automated system for passenger and baggage check-in which confirms reserved space, records information for central charge and according purposes, and issues a ticket showing the specific trip information incident to check-in.

Another object of the invention is to provide means for correlating teletyped reservation information with individual credit card information presented in a mechanized trip ticket request, and a ticket print-out upon agreement in the correlated data.

A further object of the invention is to provide a system in which a traveler having a reservation may secure a boarding pass through the operation of a computer arranged for reservation checking functions having a limited error tolerance, to give ticket print-out in response to a pushbutton request.

A still further object of the invention is to provide automated ticket issuing means including provision for variable baggage input weighing-and-computing functions with recordable output for operating a charge computer.

Another object of the invention is to provide a large capacity magnetic storage for reservation data, together with automatic means for readout and erasure of data as it is needed with means to find unused data slots for recording of new data.

These and other objects of the invention will be more clearly understood as the description proceeds in connection with the drawings of which:

FIG. 1 is a front and a back view of a typical credit card modified according to this invention;

FIG. 2 is a partial schematic front view of an automatic ticket issuing machine showing a card-punching keyboard;

FIG. 3a illustrates an airline schedule of flights from an airport;

FIG. 3b illustrates a reservation display panel;

FIG. 4 is a front view of the vending machine control panel;

FIG. 5 shows a boarding pass in blank, automatically filled in and delivered to the customer;

FIG. 6 shows a "No Ticket" slip optionally issued when a ticket cannot be issued automatically;

Figure 7:
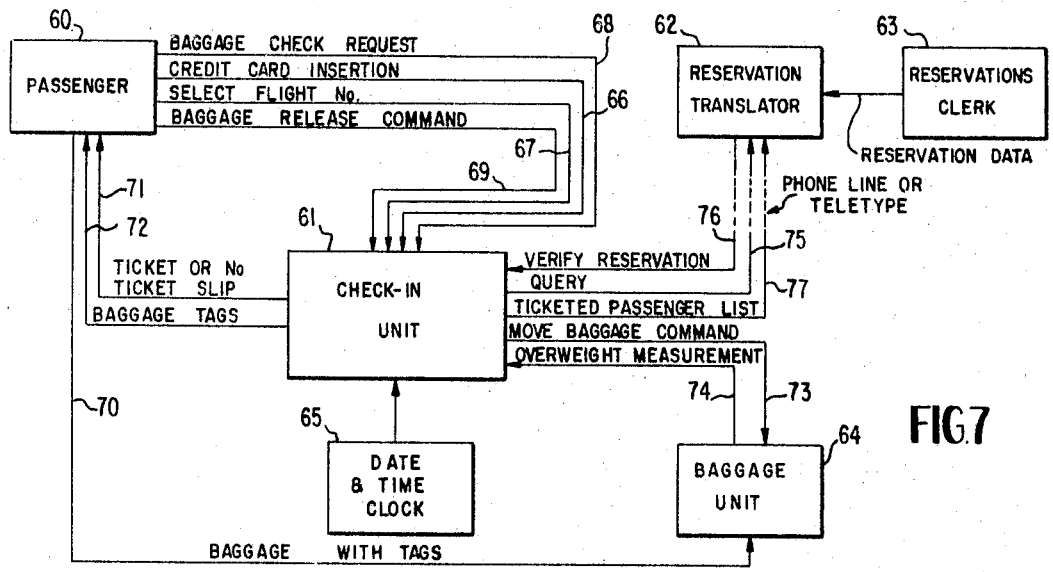
FIG. 7 is a schematic wiring diagram of the system.

While the specific apparatus to perform the functions called for in this combination may vary considerably, a system according to this invention employs a computer and mechanism having therein a storage element for recording each flight or trip time and destination, together with an identifying trip number and a visible display therefor, preferably in the form of a computer readout device, wherein each trip or unit to be sold is recorded in a readout logic form with visual display corresponding to the storage information. Such a system further has provision for scanning a credit card within the machine to readout recorded passenger identification and charging data in a form comparable by the machine with like information from a reservation already stored within the machine, as by teletypewriter means. The passenger selects a displayed flight or trip corresponding to the desired departure and destination and operates a corresponding pushbutton after inserting his credit card. A further button is preferably operated to indicate that baggage claim checks are desired, optionally including a registration of the number of pieces, and the machine thereupon issues baggage checks in the number punched, or in accordance with the number of times the baggage check button is operated by the customer. The issued baggage claim checks are then attached to the baggage by the customer, and the ticketed baggage is placed upon a weighing platform which totalizes the weight and indicates any degree of overweight in a visual display and records the same on the ticket, which is then issued upon operation by the customer of a baggage release button, or the like. By this system the baggage then proceeds automatically to the collection point for the trip or flight, and the passenger proceeds with the newly issued ticket to the boarding control point where the ticket is inspected for validity and conformity with flight load requirements as appropriate, and the passenger admitted to the boarding area.

Referring now to the dawings for a more detailed explanation of a ticketing system according to this invention, reference is made to FIG. 1 wherein is shown typical data included on a conventional credit card, modified for use in the present system. A credit card is generally designated at 10 and the reverse side thereof at 10', wherein line 11 is a conventional representation of identifying numbers and data concerning the person or organization responsible for accrued charges, according to a conventional credit card practice. As shown, the number appearing in line 11 identifies a corporation as shown in line 12 having a company address as shown in lines 14 and 15, issued to an individual shown in line 13. The reverse side of the card provides the signature in line 16 for the person shown in line 13, together with this individual number shown in line 17, along with the company name as shown in line 18 corresponding to that of line 12. Other data may be thereon shown, including the name of the credit organization, date of issue, month of validation, and other information as required.

At the top of the card a modification from the standard credit card is shown as comprising inked markings or punchings in four horizontal lines generally shown at 19 in a vertical space of about one-half inch. These markings or punchings may be in any desired code to put into machine language the information contained in lines 11 through 15. Line 19' merely shows the reverse side of the card 10 corresponding to the markings on line 19 thereof, particularly as would be true if the markings comprise punchings, in four rows, passing entirely through the card. Readout may, of course, be by optical means when markings are of printed code. When magnetic ink is used, readout may be by a traveling magnetic scanning head of conventional design. Regardless of the form of the coded identification at 19, a suitable coding is selected which may be mechanically or electronically read when the card is inserted in the machine for automating issuance of a ticket.

Since present credit cards, or other identification cards, for a person or entity may not be of desired content and form, it is contemplated that standard credit cards be modified into a form suitable for use of this system. Alternatively, new cards may be issued at the time the individual user checks in for departure, subsequent, however, to a telephone notification to the issuing office of the intent to travel and to the securing of a reservation for space on a selected trip.

FIG. 2 illustrates how a machine, not shown in detail may have provision for issuing such a credit card upon operation by the customer of a suitable semi-automatic keyboard. In this figure, the keyboard is generally represented at 20 as consisting of a name or other identification in a space comprising a number of keys of which 25 are illustrated at line 21 but which may include a number such as 36. In line 22 spaces for address are shown, generally of a similar number as the spaces in line 21. Since such keyboards are common and means connecting keys thereon to the punching or marking apparatus are well known, these are not here illustrated in detail. Line 23 is provided for a coded number such as an account number comprising nine or ten spaces and corresponding keys.

Also illustrated in FIG. 2 is a fixture 25 including a slot 26 of suitable size for inserting a blank card as illustrated in FIG. 1 for the purpose of receiving the marking according to lines 21, 22, and 23. Illustrated at 24 is an actuate button which normally has associated therewith an indicator to show the effective operation of the printing mechanism. At 27 there is illustrated a panel light connected to the encoding apparatus to indicate to the customer that the power is on. Whenever a customer desires to have his card modified for use in the automatic ticket dispensing apparatus, he may insert card 10 in the slot 26 and observe whether light 27 is operated. Thereupon, he may actuate keys in lines 21, 22 and 23, and upon completion thereof, a button associated with printing indicator 24. When the indicator 24 lights up the card 10 is ejected from slot 26, or from another slot provided for the purpose, not shown.

According to the foregoing mode of operation, the apparatus provides a credit card with suitable markings along lines as generally illustrated at 19 and 19'. A passenger having a reservation, illustratively for a particular scheduled flight and carrier, and a suitably marked credit card, approaches the ticket vending station and notes on a suitably illuminated schedule as illustrated in FIG. 3a the particular flight number, class of travel, destination, stop number, departure time, arrival time, aircraft type, etc., constituting the information given him at the making of a reservation for the desired flight. Ordinarily, the airline company is noted at the head of each panel which shows the various flights originating from that point of departure. He then inserts his card in slot 36 of the vending machine. The desired flight is selected merely by pushing one of the buttons 28, which thereupon registers in a conventional manner on a panel as shown in FIG. 3b, at the ticket issuing station, essential reservation data showing the airline 29, flight number 30, the class of travel 31, and the destination 32. In the event a reservation has been made for that flight by that customer, there will already be stored within the machine by a reservation clerk through means not shown, e.g., teletypewriter, both the name of the customer as at 33 in spaces corresponding to the spaces on the encoder and the flight as shown in 29, 30, 31 and 32. The machine also has a visible output for showing by a lighted reserve or reject indicator, 34 or 35, whether or not such a reservation has been made, operable upon suitable actuation of the selection button 28, provided a properly corresponding credit card 10 is in the slot and has been scanned as hereinafter to be described. Upon pushbutton selection by the customer of the correct flight for which the inserted card shows the name of the one who has been assigned a seat, panel 34 will be lighted to show the satisfactory registery of the reservation, such a panel is presented alongside the visible presentations at 29, 30, 31, 32 and 33.

In the event such a reservation has been made and cancelled, panel 35 will indicate this fact in accordance with a selection-rejection mechanism well known in the art and not requiring further description herein, whereas no such reservation of record is shown by absence of panel operation, optionally including a "No Reservation" sign actuation as the card is ejected.

In FIG. 4 there is illustrated a control panel presented to the customer adjacent to the flight selection board, comprising slots 36, 37 and 40. Slot 36 is similar to slot 26 in that it is of a size to receive the credit card inserted by the customer before or after pushbutton selection of the flight data for which the reservation has been made.

Upon inserting the card in slot 36 and actuating the reserved indicator at 34, a suitable mechanism not herein shown is actuated within the apparatus associated with the control panel of FIG. 4, suitable for scanning the card 10 in slot 36 and comparing the same with the name encoded at 33, corresponding to the name on the credit card. If the stored data corresponding to the specific reservation corresponds in all respects, panel 34 is illuminated to suitably indicate this to the customer, who is thus informed that he may proceed with the purchase of a ticket and obtain suitable baggage checks as desired by operation of the actuate button 38. A relay or solenoid actuated by button 38 then causes a baggage claim check to issue from the slot 37.

Suitable mechanism for this check cutting and issuing operation is well known and may be of various commercial designs. If desired, a further actuation button may be incorporated in the flight selection panel by which the customer may indicate the number of pieces of baggage to be ticketed, and this factor, once selected, causes the requisite number of baggage checks to issue from the slot 37 without further attention by the customer. Otherwise, the customer presses a button as at 38, once for each claim check desired, and receives one baggage claim check from the slot 37 in response to one actuation of the check-issuing mechanism illustrated, each bearing the selected flight and reservation data. In the latter case, when he has received sufficient baggage claim checks suitably identified with information as at 29, 30, 31, 32 and 33 and secured them to his bags, he may then operate the baggage release mechanism 39, which is preferably also electrically connected for control of automatic conveyer apparatus of conventional type, to start the baggage enroute to the collection point for the flight for which the ticket is issued.

In the event a passenger has more baggage than is permitted within the cost of the ticket purchased, this is indicated at indicator 40 by the operation of an overweight panel light. As normally operated, each piece of baggage, when ticketed, is placed upon a weighing scale immediately adjacent the conveyer system. Whenever the last portion of baggage placed on the scale for that ticket brings the total weight beyond a free baggage limit, a dial or indicator 40 indicates to the customer the fact that his baggage exceeds the free limit. Conventionally, operation of the indicator 40 is connected by way of suitable relays or electronically controlled apparatus to indicate digitally a figure to be added to the ticket price, as for example, in a conventional cash register type of calculation in which the subtotal derived from the overweight indication is merely added to the stored information concerning the cost of the particular flight and class of service punched in during the ordering stage for the ticket.

In either illustrative case, the baggage release mechanism actuated at 39 is operated prior to the printing of a boarding ticket. Mechanism 39 is a schematic illustration of a switch connecting a suitable power supply to a relay which operates to release the baggage moving apparatus and energizes the circuit by which a ticket is printed on a separate slip of paper including all information on which the flight charge is calculated. Whenever the button 39 is operated to energize the print-out function, indicator 41 is energized to initiate the printing of a ticket according to the stored and totalized information. A ticket is then printed and ejected, being usually cut from a ticket blank roll, and inserted through the slot 42 for retrieval by the customer.

Illustratively, but not restrictively, the type of information printed on the ticket will be as in FIG. 5 wherein the name, address and key number are shown at 46, the flight number at 47, departure and arrival time at 48, class of service at 49, and other identifying numbers at 50. Also, as shown at 51, 52 and 53, are the date, destination and the time of purchasing the ticket. Such a flight ticket to be valid requires also the signature of the passenger as at 54, which then may be compared by the gate attendant with the signature of the customer shown on the credit card 10. Baggage claim checks bearing a number corresponding to the number at 50 are recorded on the flight coupon at 55, in which excess weight may be shown as a total or as individual items of separate baggage.

Whenever the automatic operation of the device is incomplete for some reason, such as nonconformance of reservation to card data, the activating circuit for printing a ticket is not operable. While many circuit arrangements for the purpose are known, it will be assumed for purposes of this description that each checked item, when corresponding to a storage input, actuates a conventional gate circuit, flip-flop, or the like, to establish one element of a through circuit. When all are complete, an enabling circuit is completed and the printer operates to print out the date, by means conventional in the printing-out art. For example, when no reservation has in fact been made or a reservation has been cancelled, no ticket is issued and each operation subsequent to the selection of flight may be prevented, or a subsequent operation may occur in a particular embodiment of the invention but the output is effectively prevented by failure to actuate the print-out. Reason for failure to issue a ticket is made evident by lighting indicator 35, or failure to light indicators 34 or 41, by actuation of other indicators, not shown, corresponding to the deficiency causing the failure to print-out the ticket. Ordinarily, the customer desires a further confirmation of a refusal to issue a ticket and of the reason therefor. Thus, he may actuate button 39 even though he is already informed that he will not receive a ticket. Thereupon a "No-Ticket" slip is printed in lieu of the ticket or boarding pass.

In addition, it is convenient for other reasons to prevent issuance of a ticket as by the actuation under control of the airline captain of a separate circuit interrupter. For example, when a flight is cancelled, a flight captain actuating a circuit in a control console may actuate a relay with a lock-in winding, not shown, to effectively prevent printing any further tickets or the making of a charge therefor, optionally also actuating a relay circuit of conventional type suitable for causing to be printed on a "No-Ticket" slip the notation of "Flight Cancelled." Likewise, a cutoff time may be under control of the flight captain including a further console switch to actuate a printing circuit interrupter thereafter preventing the issuance of further tickets, optionally causing a "Too Late for Flight" indication to be printed on the "No-Ticket" slip. Furthermore, if the card scanning device functions incorrectly, or if the information encoded on the card, or if the credit card itself is defective, a further circuit is actuated also causing the remaining portions of the automatic system to fail to operate, except that printed indication may be at the "defective credit card" space of the "No-Ticket" slip. A number of preset type indications to be printed-out are thus selectively employed for actuation by relay according to the actuation circumstance. Similarly, unclassified reasons for failure to issue the ticket may be marked in the space labeled "Other—See Captain" by actuation of a relay and printing symbol thereby controlled.

FIG. 7 illustrates by block diagram the functional features of apparatus according to this system in which the stations and operative functions are illustrated at 60, 61, 62, 63, 64 and 65. A customer located at 60 initiates five or more operations in a time sequence, of which three essential functions and two optional functions are shown. Each customer presents a credit card to the check-in unit 61 to actuate an automatic reading thereof, as illustrated diagrammatically along line 66. He then selects the desired flight number by a manual operation indicated at 67, as hereinbefore described. In the event he has baggage to be checked, he makes a baggage check request by operating a baggage check issuing circuit, as previously described, illustrated in function as actuation along line 68. Whenever a baggage check demand is made as by the operation of a suitable switch 38, a baggage check is automatically cut from a roll or stack and issued at 37, and the customer secures such check to the baggage which he deposits within the baggage receiver unit 64, as indicated along line 70. Before his boarding ticket is issued, however, he must operate a baggage totalizing and release mechanism to set the baggage check mechanism for the next customer. This function is illustrated as an electrical actuation as along line 69, by the operation of a further pushbutton 39, also as previously described. At the same time, charging information is recorded in the memory storage. Thus, whenever operations 66, 67 and 69 are completed within the check-in unit illustrated at 61, operation 69 provides the necessary circuit completion for producing a print-out slip indicating "no-ticket" issued, presented to the passenger as along line 71, or constituting a completed ticket, indicated functionally also along line 71. When a baggage check request has been made as at line 68, the mechanism effects the issuance of a baggage check or tag to the passenger as along line 72, although issuance of such a tag is not essential to the operation of the system. As illustrated, the boarding ticket is ejected upon operation of the baggage release button in operation 69.

As previously described, baggage checks are ordered by repeated actuations of the baggage check-issue button (or by a preset number of checks selected before operation of the switch at 68) and the checks are placed upon the baggage as the baggage is placed in the baggage receiving unit. Weight measurement is made prior to the baggage release command along line 69. Baggage release in response to 69 produces an electrical actuation along line 73 of the baggage moving equipment, optionally including the previously described overweight measurement illustrated at line 74 to show visibly on the check-in unit display in 61 the amount and cost of overweight measured.

Time and date is normally printed on the ticket under control of a conventional date and time clock 65 actuated through conventional means not shown. In addition, the check-in unit performs the functions previously described in varifying a reservation, as functionally illustrated by query line 75, and response or verification line 76, in control of a print-out circuit finally actuated as the customer operates the baggage release switch. The check-in unit normally is equipped with an additional function useful in the control of the flight by the flight captain. This may consist of a resettable counter which tallies a running total of passengers checked in for that flight, or of a separate passenger list optionally printable from stored check-in data within the check-in unit 61. In either form desired, actuation of the ticketed passenger total print-out may be programmed in to serve as an inhibitor, according to well known computer circuitry for preventing a further confirmation of a reservation or ticketed passenger when a limiting switch is actuated on reaching a keyed-in limit. This is illustrated by electrical actuation along 77 occasioned by a predetermined total being reached wherein storage and comparator elements compare the stored total with the instant total, or a rotary counter may operate a limit switch, to provide an output signal disabling the ticket issuing actuation circuit. Illustrated schematically at 63 the input provided by the reservation clerk is oftentimes considerably in advance of the appearance of the passenger to purchase his ticket. Reservation data as recorded by telephone or otherwise at the reservation desk is suitably encoded and transmitted to the reservation translating device at 62 and becomes a comparison signal stored therein for matching with the query comprising information in lines 66 and 67 passing through the check-in unit 61 and via query line 75, to the reservation translator 62. Thereupon when all prerequisites are satisfied and comparisons found favorable, the reservation verification becomes a positive electrical output signal as required circuits become completed, indicating on the panel at 61, thereby permitting the printing of the ticket delivered to the customer via 71 and effecting the totalizing operation at 77.

Figure 8:
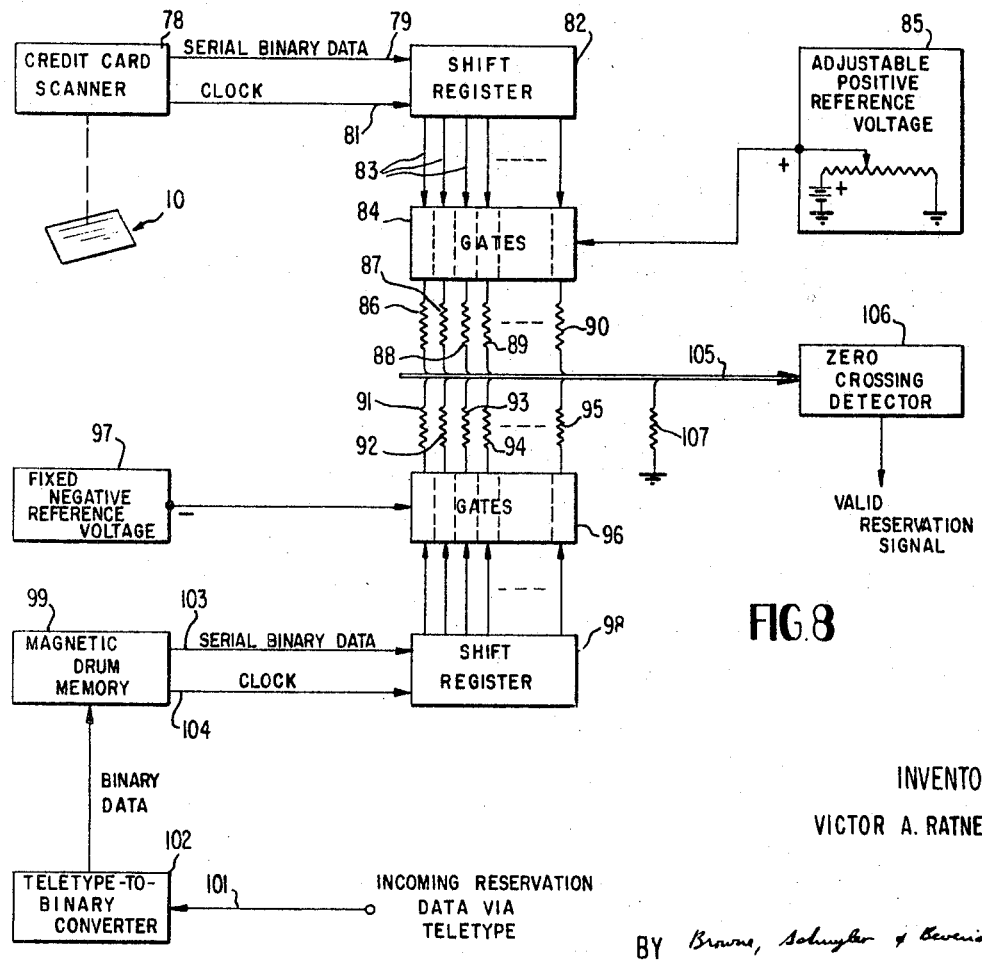
FIG. 8 is a schematic diagram of a variation in the system to provide a variable tolerance in data compared to card data for issuing a ticket.

An additionally desirable feature may be incorporated in the system as in FIG. 8 to accommodate a small error margin permitted in the name comparison. Since telephone operators may sometimes record reservation names incorrectly, it will be appreciated that a name comparator mechanism may reject the ticket demand of a customer merely for an error in, or loss of, a single letter in the signal read from the credit card and/or from the stored reservation data, even through the flight information is correct and a reservation has in fact been made by a valid card holder. Such comparison circuits may usually be of the kind where each letter of the alphabet has a distinctive identification signal (as in card punch mechanisms, for example) and a number of signals corresponding to the digits in the reservation name is programmed into the reservation comparator. A credit card must then be presented in which the same number of digits must be found, each corresponding in a sequence of like signals to the same stored signal sequence. Thus an insufficient number of card readout characters, or an error in sequence, or a nonconcurrence of signals, would result in negative or no output from the reservation comparator, or, optionally, an error output signal may be caused to immediately operate the "No-Ticket" mechanism. A tolerance to accommodate a single, or a pair of error signals in a name may be readily built into the comparator so that, upon storage of a name of 14 characters, the successful comparison of 13 or 12 of the characters may be made sufficient for the operation of the ticket issuance circuit.

One means by which such a tolerance may be built in is to provide an integrated storage signal, in like bits for each correct character, and a readout upon achieving storage increments equal in number to, for example, one less than the full number of characters in the reservation name and/or address. Each storage increment may thus be added in response to a correspondence between a stored character and the same sequential character of the credit card. A number of signal storage counting and integrating circuits for this purpose are well known and readily provide an integrated signal output which represents a present total registered in the check-in computer as the reservation data is stored therein according to the particular storage and retrieval plan built into the memory unit.

FIG. 8 thus illustrates one form of apparatus as described to accomplish reservation comparison with credit card data for a flight and issuance of a ticket when teletyped reservation data does not differ from card and flight selection data by more than a preset margin of error.

The credit card scanner 78 scans the binary information on credit card 16 and enters this as serial data along line 79, preferably with a clock signal along line 81 into a shift register 82. Each stage of the shift register is connected by lines as at 83 to a current gate 84 which switches a given reference voltage from source 85 into a resistor 86, 87, 88, 89, or 90 connected to a summing bus. This is similar to the conventional digital-to analog converter technique except that equal value resistors are used rather than binary value weighted resistors. Thus, every data bit contributes an equal portion of current to the summing but and, therefore, carries equal importance in building up the resultant analog voltage. A similar series of registers 98, gates 96, and resistors 91–95 with a negative reference voltage from source 97 are fed by a magnetic drum memory 99 which contains converted teletype messages of the passengers' names as transmitted by the reservations clerk, via line 101, teletypewriter converter 102 to drum 99 and thence by line 103 to shift register 98, along with a clock signal as at 104.

The summing bus 105 is connected to a zero crossing detector 106, also known as an analog voltage comparator or level detector, which provides an output signal whenever the input voltage approaches zero volt. Resistor 107 connects bus 105 to ground for long term drift neutralization.

Thus, by using a fixed negative reference voltage and providing an adjustable positive reference voltage, the system may be made to trigger the zero-crossing detector when the two sets of parallel digital data disagree by a chosen number of bits. A knob which controls the positive reference voltage may be calibrated in percentage of error, tolerance or number of wrong characters.

Thus, the system indicates correlations between the passenger's name on the credit card and that transmitted by the reservations clerk with any preprogrammed degree of error tolerance.

Figure 9:
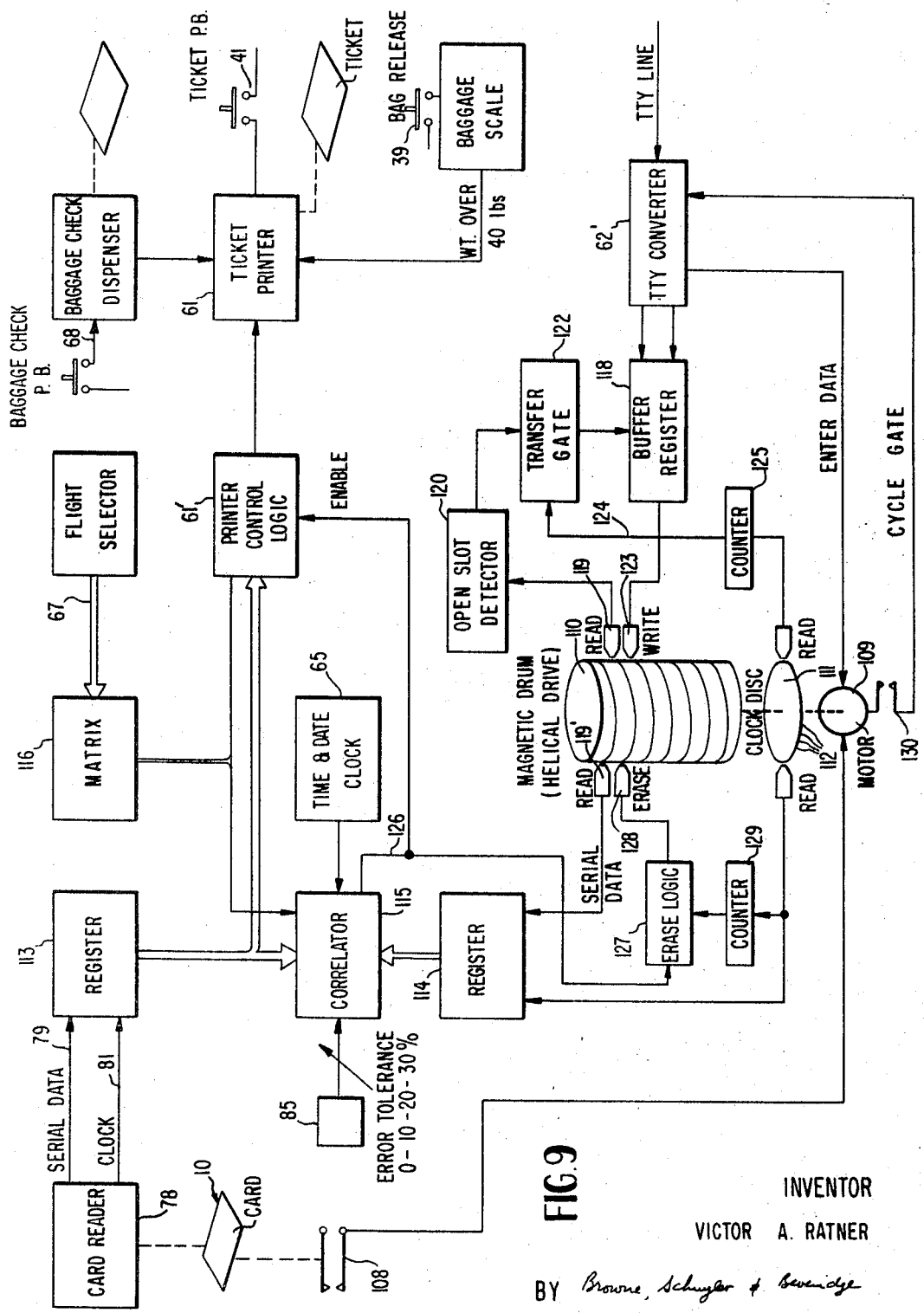
FIG. 9 is a block diagram of one form of overall system according to this invention employing magnetic drum storage.

According to one embodiment of the invention, the check-in unit forming the central control of the system may employ an improved magnetic drum storage for reservation data for readout and comparison as previously described, according to the diagram of FIG. 9. In this embodiment a storage drum is operated in a manner to receive data continuously over a long period of time and to read back received data in response to a ticket request. Instead of a separate reading head for each of a number of tracks a continuous track is used, extending spirally around the drum. Readout is by rotation of the drum while advancing the drum along its shaft one track width for each rotation of the drum.

Also incorporated in the storage and readout mechanism is an automatic means of cancelling reservation data on ticket print-out corresponding thereto, and re-using bits of the drum storage when the used data was stored, and for finding vacant spots on a record where such used data existed, was erased, and may be re-used.

As the credit card 10 is inserted in its slot 36 it trips a microswitch 108 which actuates motor 109 of the magnetic drum memory 110. Precise speed regulation of the drum is unimportant since a disc 111 driven by the motor shaft has clock or timing pulses 112 recorded on its circumference. The card reader 78 scan the information on the card and feeds serial data and clock signals to a storage register 113. The parallel outputs of the register are applied to one input of the correlator 115 along with flight information derived from a matrix 116 which decodes the flight selector data. A time and date clock 65 also provides information to the correlator 115. The opposing inputs for comparison in the correlator are fed by the parallel outputs of a similar register 114 which receives its serial input from helical drum 110. The drum logic operates as follows.

When a new reservation is received via line TTY, an enter-data command is generated which actuates the drum motor if microswitch 108 is closed. Each item of new reservation information is then converted to binary form in 62' and held in a buffer register 118 until the read head 119 encounters an open data slot, indicated in a detector 120 responding to absence of signal from head 119, that is, a place on the drum where data has been erased by head 128. The absence of data is detected and used to open a transfer gate 122 which will enable the buffer register 118 to dump the stored information upon command to write head 123 located adjacently below the read head, displaced by exactly one line on the drum. Thus, when the read head encounters an open slot, the transfer gate 122 is opened, but a dump pulse via line 124 is not delivered to the buffer register until a complete revolution of the drum has been made. This is determined by counting clock pulses on disc 111 in counter 125.

Readout of the drum memory is accomplished by a set of diametrically opposed heads which constantly scan the data on the drum and feed it in serial form to the register 114 connected to correlator 115. If correlation occurs, the correlator emits a pulse on line 126 which performs two functions. It first enables the printer control logic operative to cause the printer wheels to be actually positioned in accordance with the data from the credit card. It also actuates logic module 127 to erase the data word from the drum to make room for new incoming data. The erase process is similar to the read-in process. That is, an erase head 128 is positioned exactly on line below the corresponding read head and, upon receiving an erase command, a counter 129 counts clock pulses to determine when one complete revolution of the drum has been made. At this point the erase head is activated for a period equal to one word length. If correlation is never achieved, the data remains on the drum and a "No Ticket" is issued.

A further control on entry of data in the buffer register is effected by switch 130, operated by motor 109 after a suitable time following initiation by switch 108 to provide a limited duty cycle gate enabling converter 62' to pass on its converted binary data to register 118.

While the invention has been described with respect to particular examples of readout and comparison devices and illustrates a particular type and sequence of printout actuation steps, it will be apparent to those skilled in the art that the invention may be practiced otherwise than as specifically described and applicant desires to limit the scope of the invention only as set out in the following claims, including equivalents.

What is claimed is:

1. A flight ticket dispensing system, comprising
computer storage means for registering identifying signals corresponding to characters identifying the maker of a reservation for a flight,
means under control of an operator for registering said identifying signals in association with memory storage means individual to said flight,
means in a check-in station receiving a credit card bearing characters identifying the holder of said card,
means in said station operable by a card holder for selecting an input channel therein corresponding to said memory storage means for said flight,
means reading said card and comparing signals therefrom corresponding to said characters with a sequence of similar signals stored in said storage means,
output means operable upon said comparison of signals to actuate a first circuit when said characters read and stored are alike and to actuate a second circuit when said characters are not alike,
means under control of said first circuit actuatable to cause printing of a ticket bearing identification of said flight and at least a part of said characters, and
means under control of said second circuit to cause printing of a "No-Ticket" slip upon actuation of last said means when said stored and read characters are not alike.

2. A flight ticket dispensing system according to claim 1 further including means actuatable by a card holder to cause printing of a baggage claim check identifying said flight before said output means becomes operable to print said ticket.

3. A system according to claim 2 including means registering the weight of baggage therein disposed and transferring to said ticket printing means a character indication signal corresponding to said weight, said character signal being coupled to effect printing together with said flight identification.

4. A flight ticket dispensing system according to claim 1 including means actuable when said signals have been compared and said first circuit is actuated to prevent said printing of a ticket until a third circuit is actuated, said third circuit including automatic weighing and recording mechanism effective to compare a total weight with a predetermined value and indicate excess of one over the other as a prerequisite to said actuation of said third circuit and issuance of said ticket.

5. A trip reservation ticket issuing system, comprising
means storing a first set of data signals identifying one said trip upon actuation from a first system input,
means storing a second set of data identifying a trip reservation fed into said means at a second system input as an electrical signal sequence,
means cooperating with said first storage means responsive to data keyed at a third system input for selecting for readout said data signals identifying one said trip,
means receiving a card bearing personal identification data in electronically readable form,
means reading said personal data and converting said data to a like signal sequence when said reservation data and said personal data are in agreement,
means comparing said signal sequences and actuating a first output printer when said sequences are alike, and a second output printer when said sequences differ,
first printer means responsive at substantial coincidence upon like said signal sequences with like said trip data signals stored and selected for issuing a ticket imprinted with said trip and personal data, and
second printer means operative when substantial coincidence is not found upon said comparison of data signals.

6. In an automatic ticket issuing system arranged to print a ticket for each prerecorded reservation for each of a plurality of trips,
means recording in recoverable form essential data indications of each reservation including name, time, class of service and destination for which a reservation is made at a trip control center,
means separately displaying at said center the time, class of service, and destination for each said trip,
means at said center for registering a selection by a passenger of the desired trip,
means responsive to said registered selection for receiving a credit card bearing personal data indications in recoverable form,
means reading said data on said card,
means comparing said data from said card with said recoverable data indications to provide a first output signal upon coincidence thereof, printing means individually settable for each said trip to imprint the trip time, classification of service and destination on a ticket, and electric means actuated in response to said first output signal for causing said printing and the issuance of a ticket so printed.

7. In a system according to claim 6, said comparing means being arranged to produce a second output signal when no coincidence is found between said data on said card and said recoverable data, and means for printing a "no-ticket" slip in response to said second output signal.

8. In a system according to claim 6, circuit switching means in series with said printing means preventing actuation thereof until said circuit means is closed, baggage weighing means responsive only after said comparing means is actuated according to said compared data for producing a further output signal, means manually actuable by said passenger to cause closing of said switching means after said further output signal is produced, and means repsonsive to said further output signal for imprinting a weight indication on said ticket.

9. In a system according to claim 6, said means for recording essential data indications comprising a receiver for signals bearing said essential data, means converting received signals to binary form for magnetic recording, drum storage means for receiving converted data in serial form, means locating unused portions of said drum storage means, and means recording only in said portions binary signals conforming to said essential data.

10. In a system according to claim 6, said means for recording essential data indications including magnetic drum storage means spirally driven to pass reading, writing and erasing means disposed adjacently thereto, and time indicating means rotative with said drum storage for coordinating positions of reading, writing and erasing thereon.

11. In a device for comparing machine stored data corresponding to data recorded on a credit card, machine means for storing a set of indicia groups in a form recoverable as digital data groups, means for receiving a credit card bearing recorded groups of indicia recoverable as digital data groups corresponding to said indicia groups, means responsive to insertion of said credit card into the receiving means for scanning said recorded indicia and providing output voltages representing a sum of digital data increments in each of said data groups, means reading digital data from said card as a group of voltages corresponding to incremental sums of digits in each of said indicia groups recorded thereon, means responsive to insertion of the card for reading out from said machine means stored indicia groups as a summed increment voltage, means comparing said voltages for each of said recorded groups with said voltages of corresponding stored groups, and means providing an output signal when said summed voltages agree within a predetermined tolerance.

12. In a device according to claim 11, last said means including voltage controlled gate means for setting the level of said predetermined tolerance.

13. In a device according to claim 11, means providing a second output signal in response to disagreement between compared voltages in one or more of said groups.

References Cited

UNITED STATES PATENTS

| | | | |
|---|---|---|---|
| 2,275,590 | 3/1942 | Johnson | 235—61.7 |
| 2,325,958 | 8/1943 | Johnson | 235—61.7 |

DARYL W. COOK, *Primary Examiner.*

U.S. Cl. X.R.

340—149; 235—61.1